United States Patent [19]

Scott

[11] Patent Number: 4,892,216

[45] Date of Patent: Jan. 9, 1990

[54] FUEL FILLER CAP WITH OVERPRESSURE RELIEF

[75] Inventor: Richard E. Scott, Naples, Fla.

[73] Assignee: Shaw Aero Development Inc., Naples, Fla.

[21] Appl. No.: 296,570

[22] Filed: Jan. 13, 1989

[51] Int. Cl.[4] ............................................ B65D 51/16
[52] U.S. Cl. ..................................... 220/206; 220/246
[58] Field of Search ............... 220/203, 206, 208, 246, 220/247

[56] References Cited

U.S. PATENT DOCUMENTS

| | | | |
|---|---|---|---|
| 2,072,271 | 3/1937 | Meadows | 137/53 |
| 2,834,374 | 5/1958 | Klinkenberg | 137/541 |
| 3,027,912 | 3/1962 | Carr et al. | 137/478 |
| 3,131,718 | 5/1964 | Mingrone | 137/512.1 |
| 4,005,341 | 1/1977 | Uptegraff, Jr. et al. | 220/246 X |
| 4,271,976 | 6/1981 | Detwiler | 220/206 |
| 4,276,901 | 7/1981 | Lyons | 137/469 |
| 4,431,023 | 2/1984 | Johnson | 137/541 X |
| 4,467,937 | 8/1984 | Shaw | 220/246 |
| 4,579,244 | 4/1986 | Fukuta | 220/206 X |
| 4,674,530 | 6/1987 | Bickford | 137/469 |
| 4,830,213 | 5/1989 | Sleder | 220/203 |

*Primary Examiner*—Donald F. Norton
*Attorney, Agent, or Firm*—Pennie & Edmonds

[57] ABSTRACT

An improved fuel filler cap for fuel tanks of motor vehicles is disclosed. A cap body member is attached by an actuator rod to an anchor disc, which mates with a tank adapter. When an actuator handle is rotated from a free to a locked position, the anchor disc is engaged with the adapter and drawn towards the underside of the cap, thus insuring a good seal between the cap and the adapter. A first spring disposed between the actuator rod and anchor disc limits the pressure in the tank, such that if an overpressure occurs, the cap is permitted to lift entirely off the adapter, quickly relieving the overpressure. A second spring is preferably provided to positively urge the anchor disc away from the cap upon release of the handle, providing superior operating feel and over-center 10 locking of the handle. The outer surface of the cap is configured so that impacts are absorbed by the adapter, preventing leakage of the cap.

21 Claims, 2 Drawing Sheets

FUEL FILLER CAP WITH OVERPRESSURE RELIEF

FIELD OF THE INVENTION

This invention relates to a fuel filler cap with overpressure relief for motor vehicles. More particularly, this invention relates to a fuel filler cap which provides rapid release of overpressure gas within the associated tank, which passes all applicable vehicle safety tests, including an exacting drop test, and which can be readily and economically manufactured without exacting assembly procedures.

BACKGROUND OF THE INVENTION

Commonly-assigned U.S. Pat. No. 4,467,937 to Shaw describes a fuel filler cap assembly in which the cap transmits impact loads to the body of the associated fuel tank by way of mating seal members. Such transfer of impacts is essential in order that the fuel filler cap assembly can pass an applicable drop test for the safety of such tanks. In this drop test, the fuel tank is filled to 90% of its fuel weight capacity with water or the like and dropped, directly on the fuel cap, from a height of 10 feet, onto a steel plate. According to the Shaw patent, the fuel cap should be constructed such that impacts from such planar surfaces are transmitted through the cap directly into the structure of the tank.

The cap shown in the Shaw patent has met with substantial commercial success. Applicant desired to improve its structure further by reducing the amount of material required to form its principal component, the cap body member. Moreover, the Shaw device as commercially produced includes a poppet valve for releasing overpressure of gas within the associated fuel tank. The flow capabilities of poppet valves are limited by the flow area around the valve head when the valve is open. It was designed to increase this gas flow region.

The cap shown in the Shaw patent also requires careful adjustment of the axial position of the retaining member 10 with respect to the cap body member, as this relation controls the integrity of the seal between the cap body member and the filler adapter provided on the fuel tank. It was desired to simplify the assembly procedure required, thus reducing cost.

In conjunction with these improvements, it was also desired to retain certain desirable features of the Shaw cap, namely a weather protected key lock securing the fuel tank assembly, attractive appearance, and proper tactile characteristics for the user of the cap. It was also desired to ensure that rain, snow, mud or other debris would not accumulate on the cap.

SUMMARY OF THE INVENTION

The present invention satisfies the needs of the art and objects of the invention mentioned above by provision of an improved fuel filler cap. The cap of the invention comprises a circular cap body member which is generally planar. The cap body member comprises an annular groove about its periphery, which receives an annular upstanding seal member formed on an adapter comprised by the fuel tank. Typically the annular groove in the cap carries an O-ring mating with a radially outermost portion of the annular seal member on the adapter.

The cap is urged into sealing engagement with the adapter by an anchor disc, which is drawn toward the cap body member by an actuator assembly. The anchor disc comprises three fingers extending radially outwardly. The adapter is formed to comprise three ears which extend radially inwardly with respect to three interspersed recesses. To secure the cap to the adapter, the anchor disc is inserted into the adapter, with its fingers in the recesses, and is then turned approximately 60 degrees. The user then moves an actuator handle from a free to a locked position. The actuating handle comprises a cam which interacts with a mating surface on the cap to pull an actuating rod, on which is mounted the anchor disc, axially outwardly. This urges the fingers of the anchor disc against the ears of the adapter, pulling the cap into engagement with the adapter and sealing it thereto.

According to one aspect of the present invention, the anchor disc is secured to the actuator rod by way of an overpressure spring connection. In normal use, the actuator rod, overpressure spring and anchor disc behave as a rigid member. However, if the gas pressure on the underside of the cap exceeds the force exerted thereon by the spring, the entire cap is lifted off the adapter, allowing rapid escape of gas, relieving the pressure within the tank.

According to another important aspect of the invention, a second spring, which may comprise a spring washer, is disposed between the anchor disc and the cap body. When the actuating handle is moved from its locked position to its free position, the second spring positively moves the anchor disc away from the cap body member and out of engagement with the ears on the adapter, ensuring positive release of the cap from the adapter. The second spring also provides over-center locking retention of the actuating handle in the locked position. The cap body member may also have mounted therein a key lock for preventing rotation of the anchor disc, thus providing a theft-proof fuel filler cap with rapid overpressure release.

The periphery of the cap is specifically shaped such that any impact against a planar member is transferred directly to the adapter, whereby the cap readily satisfies the drop test currently in use.

BRIEF DESCRIPTION OF THE DRAWINGS

The invention will be better understood if reference is made to the accompanying drawings, in which.

DESCRIPTION OF THE PREFERRED EMBODIMENTS

Figure 1:
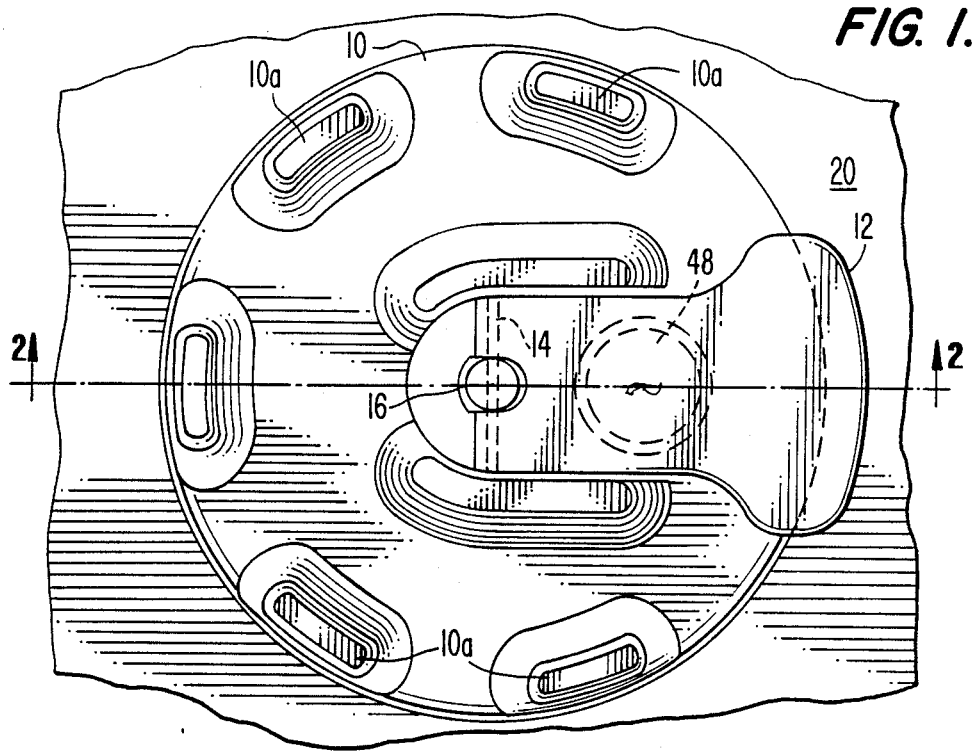
FIG. 1 shows a plan view of the cap of the invention.
Figure 2:
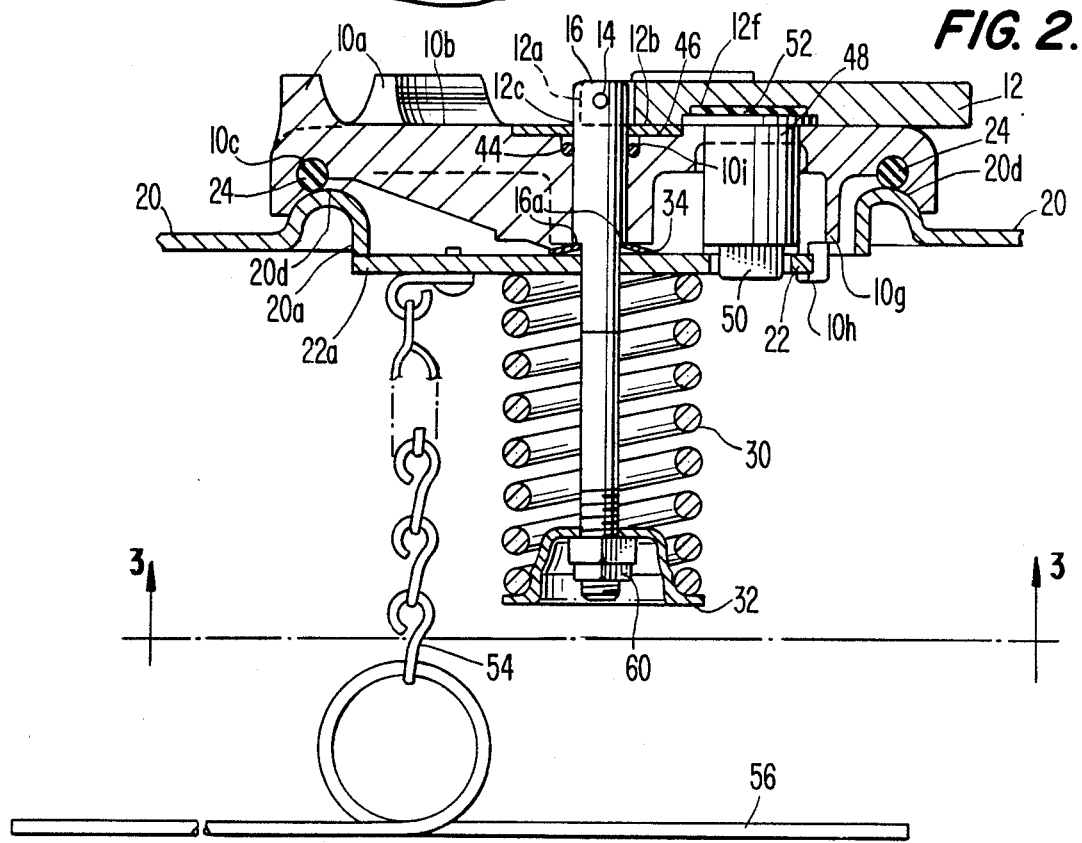
FIG. 2 shows a cross section along the line 2—2 of FIG. 1.

FIG. 1 shows as mentioned a plan view of the cap of the invention. The cap comprises a cap body member 10 and an actuating handle 12, which is pivoted at a pivot point by a pivot pin 14 to an actuator rod 16. As shown in FIG. 1, a number of castellations 10a are formed in the surface of the cap 10. Their cross-sectional shape is shown in FIG. 2. The castellations or a continuous rim member (not shown) extend outwardly from the planar surface 10b of the cap 10 a distance somewhat greater than the thickness of the structure at the center of the cap, such that the structure on the outer periphery will receive any impact of the cap against a flat surface. The force of the impact is therefore transferred directly to a conventional adapter comprised by an associated fuel tank, which adapter is indicated generally at 20. This provides a cap structure which will pass the very severe drop test currently in use without leakage from the cap.

As also shown in FIG. 1, the end of the handle 12 which is not pivoted at pin 14 extends some distance beyond the outer periphery of the cap 10. This distance is a compromise, in that a longer handle is easier for a gloved hand to grip, but a shorter handle reduces the likelihood that an impact will fracture the pin 14 or cause other damage to the cap structure upon impact. The approximate dimensions shown have been found generally to yield a cap which will pass the drop test and which is readily usable under most conditions.

As indicated in FIG. 2, the castellations 10a meet the planar surface 10b of the cap at a relatively large-radiused fillet. This prevents mud, snow, rain or the like from collecting as might occur if the castellations and the surface of the cap met at sharp corners, or if a continuous rim upstanding from the surface of the cap were used.

Figure 3:
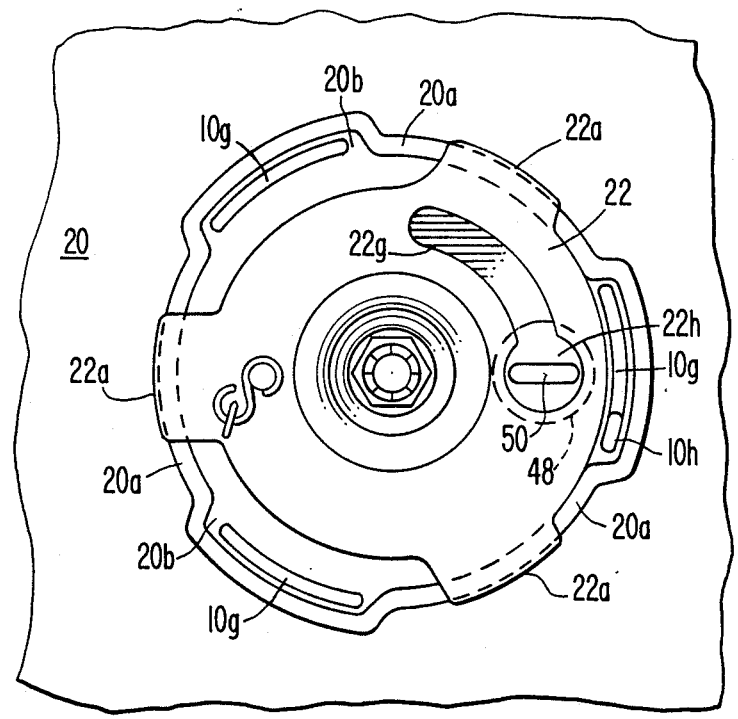
FIG. 3 shows a rear view of the cap of the invention, taken along the line 3—3 of FIG. 2, with the cap of the invention in the closed and locked position.
Figure 4:
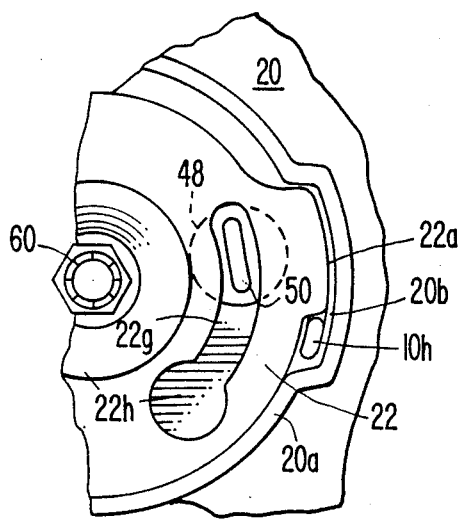
FIG. 4 shows a view comparable to that of FIG. 3, but with the cap of the invention in the unlocked and released position.

As shown by FIG. 3, the anchor disc 22 is generally circular and has formed thereon three or more fingers 22a. A like number of recesses 20b are formed in the generally cylindrical inner wall of the fuel filler opening defined by the adapter 20, between ears 20a which extend radially inwardly. When the anchor disc 22 is aligned such that its fingers 22a fit within the recesses 20b (as shown in FIG. 4) it can be inserted through the adapter 20. When the anchor disc is then turned approximately 60 degrees, to the FIG. 3 position, it cannot be withdrawn from the adapter. When the anchor disc is then urged toward the cap 10, the cap 10 is drawn into engagement with the adapter 20, forming a good seal therebetween.

The seal is formed by an O-ring 24 (FIG. 2) received in an annular groove 10c extending around the cap 10. The O-ring 24 mates with a mating surface 20d of generally semicircular cross sectional shape formed on the adapter 20. Preferably, the O-ring 24 meets the surface 20d at a radially outer portion thereof, so that any nicks from the fuel filler nozzle, which will typically occur on a radially inner portion of the mating surface 20d, do not interfere with the formation of the seal. Leakage of fuel from inside the tank along the actuator rod 16 is prevented by a further O-ring seal member 44 disposed in a groove 10i formed in the interior wall of the aperture in the cap 10 through which the actuator rod 16 passes.

As mentioned, the actuating handle 12 is pivoted by pin 14 to the actuator rod 16. As indicated in FIG. 2, the distance of the center of the pin 14 from the end 12a of the handle is less than its distance from the undersurface 12b of the handle. Therefore, when the handle 12 is moved from a position in which it extends perpendicular to the plane of the cap to the position shown in FIG. 2, where it is generally parallel to the cap, a camming surface 12c interacting with a mating surface on the outer surface of the cap forces the actuator rod 16 axially outwardly. A stainless steel washer 46, against which the cam surface 12c of the handle 12 can bear, may be provided in a recess in the outer surface of the cap 10, thus reducing galling between the cap 10 and handle 12, which are preferably both formed of aluminum. A spring washer 34 is disposed between the cap body member 10 and anchor disc 22, urging the actuator rod 16 inwardly, and the radius of the camming surface 12c is relatively small, so that the maximum outward movement of the pivot point occurs when the handle 12 extends at roughly 45° to the plane of the cap. This provides an over-center locking action to the handle 12, which not only provides a desirable tactile "feel" to the handle as it snaps into the locked position, but also ensures that it does not move into its free position in service.

Figure 5:
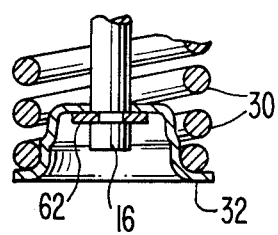
FIG. 5 shows a alternative embodiment of a portion of the cap of the invention.

Movement of the pivot point outwardly in turn moves the actuator rod 16 outwardly with respect to the cap 10, drawing the anchor disc 22 against the adapter 20, and thus securing the cap 10 thereto. The anchor disc 22 is urged against shoulders 16a on the actuator rod 16 by a first pressure relief spring 30 which is confined behind a spring retainer 32. The preload on spring 30 controls the point at which overpressure within the tank causes the cap to lift. In the FIG. 2 embodiment, the preload is adjusted by a nut 60 threaded onto the actuator rod 16. In an alternate embodiment shown in FIG. 5, a circlip 62 fitting within a groove in the actuator rod 16 locates the spring retainer 32. The spring retainer is preferably shaped to prevent the circlip 62 from becoming detached. A cross pin extending through a hole in the actuator rod could also be used.

The preload of the spring 30 is relatively high, so that in normal operation the anchor disc 22, spring 30, and actuator rod 16 move together as a single unit. Specifically, the preload of spring 30 is greater than that of spring washer 34. Therefore, when the lever 12 is moved from its free position to its locked position, moving the actuator rod 16 axially outwardly, the spring washer 34 which is interposed between the cap body 10 and the anchor disc 22 is compressed, providing the over-center retention of the handle 12 previously discussed. If the spring washer 34 is fully compressed before the actuator handle touches the cap, the pressure relief spring 30 is also compressed somewhat. Its spring rate is low, so that this additional preload does not change the over pressure relief point substantially. Provision of spring 30 thus allows a certain amount of relaxation of manufacturing tolerances as compared to the directly coupled arrangement shown in the Shaw patent.

When the handle 12 is subsequently moved back to the free position, spring washer 34 urges the anchor disc 22 away from the cap body 10 and off the ears 20a of the adapter. The anchor disc 22 slides along but is keyed to the actuator rod 16 by flats on the rod fitting within a corresponding-shaped hole in the anchor disc. To remove the cap, the handle is rotated through approximately 60°. When the fingers 22a on the anchor disc 22 are aligned with the recesses 20b in the adapter (as in FIG. 4), the entire cap assembly can be withdrawn from the associated tank.

It will be appreciated that according to an important aspect of the invention, internal overpressure in the tank cap lifts the entire cap, rapidly releasing the overpressure. The first spring 30 controls the amount of overpressure which causes the cap to lift. The second spring 34, strictly speaking, is optional in that the overpressure relief function does not depend on the second spring 34. However, the second spring provides a desirable tactile "feel" in the motion of the lever. Moreover, the second spring 34 provides over-center locking of the handle 12 by urging the undersurface of the handle 12 against the planar surface of the cap 10, thus preventing accidental dislodgement of the handle due to bumps in the road and the like.

As shown in FIGS. 3 and 4, an arcuate aperture 22g is formed in anchor disc 22, having a circular portion 22h at one end. When it is desired to provide a locking fuel cap according to the present invention, a conventional key lock 48 having a rotating tang 50 of generally rectangular cross section may be retained in an aperture in cap body member 10. Tang 50 is rotated between a locked position shown in FIGS. 2 and 3, and an unlocked position shown in FIG. 4, by operation of the key lock 48. When the anchor disc 22 is rotated, the tang 50 moves with respect to the arcuate recess 22g, from the position of FIG. 3 to the position of FIG. 4, thus allowing the fingers 22a to be aligned with recesses 20b and the cap to be removed. When the tang 50 is in the locked position of FIG. 3, rotation of the anchor disc 22 is prevented. Preferably a recess 12f in the handle which is provided to receive the lock 48 is fitted with a resilient rubber insert 52 to provide a measure of weather protection to the innards of the lock 48.

In embodiments of the invention in which the lock 48 is not provided, a member corresponding to the shape of the tang 50 in the unlocked position of FIG. 4 may be provided. This member can be formed integrally with the cap and extends within the arcuate recess 22g in the anchor disc 22 to control the amount of relative rotation permitted to the anchor disc 22.

As may be observed from FIG. 4, when the cap 10 is inserted into the adapter 20, the fingers 22a on the anchor disc are aligned with projections 10g on the cap, and both go into the recesses 20b in the adapter together. When the actuator handle 12 is then rotated to rotate the anchor disc, the projections 10g prevent rotation of the cap with respect to the adapter. One of these projections 10g may further be extended as shown at 10h, to limit rotation of the anchor disc 22 with respect to the cap 10.

Completing the assembly of the cap of the invention, a chain 54 and cross member 56 may be provided so that the cap is retained by the chain 54 when removed from the adapter 20 to allow filling of the associated fuel tank.

While a preferred embodiment of the invention has been described, it will be realized by those of skill in the art that there are numerous modifications and improvements thereto which can be made without departure from its spirit and scope. Therefore, the invention should not be limited by the above disclosure, which is purely exemplary, but only by the following claims.

I claim:

1. A filler cap for mating with an adapter comprised by a fuel tank, said adapter comprising a circular wall defining a circular filler opening into said tank, an annular sealing member of generally uniform cross-sectional shape upstanding from an exterior wall of said tank, and a plurality of ears spaced circumferentially around and extending radially inwardly from the circular wall, said cap comprising:

a cap body member having formed therein an annular surface for receiving said annular sealing member;

first seal means disposed on said sealing member or within said groove for engaging the other of said sealing member and groove to form a gas-tight seal therewith;

an anchor disk comprising a central portion and a plurality of fingers equal in number to said plurality of ears spaced circumferentially around said central portion;

an actuator rod extending through a central hole formed in said cap body member and a central hole in said central portion of said anchor disk, so that said anchor disk is enabled to slide along said actuator rod;

an actuator lever pivoted to a first end of said actuator rod at an axis external to said cap body member, said actuator lever comprising a cam surface contacting a mating surface on an outer surface of said cap body member, the pivot point being located with respect to said lever surface such that pivoting of said actuator lever from a first free to a second locked position moves said actuator rod axially outwardly with respect to said cap body member; and a first pressure limiting spring disposed between a second end of said actuator rod and said anchor disk, urging said anchor disk into engagement with a shoulder formed on said actuator rod;

whereby if gas pressure on the inner surface of said cap body member exceeds the force exerted on said anchor disc by said first spring when said actuator lever is in its locked position, said cap body member is moved axially outwardly, off said annular sealing member, releasing said pressure.

2. The cap of claim 1, further comprising a second locking compression spring disposed between said cap body member and said anchor disk, whereby upon movement of said actuator lever from its locked position to its free position, said anchor disk moves axially inwardly together with said actuator rod under bias provided by said second spring.

3. The cap of claim 2, wherein said second locking compression spring is one or more spring washers.

4. The cap of claim 1, wherein said first pressure-limiting spring is a compression coil spring disposed around said actuator rod and confined between a spring retainer mounted on said second end of said actuator rod and said anchor disk.

5. The cap of claim 4, further comprising means for adjusting the axial position of said spring retainer along said actuator rod to control the pressure exerted on said anchor disc by said first spring.

6. The cap of claim 5, wherein said means for adjusting is a nut threaded on said actuator rod.

7. The copy of claim 4, wherein the axial position of said spring retainer with respect to said actuator rod is fixed.

8. The cap of claim 7, wherein said position of said spring retainer is fixed by circlip means fitting within a circumferential groove formed in said actuator rod.

9. The cap of claim 8, wherein said spring retainer is formed to define a recess receiving said circlip means to prevent its disengagement from said actuator rod.

10. The cap of claim 1 further comprising second seal means preventing leakage of gas around said actuator rod through said central hole in said cap body member.

11. The cap of claim 10, wherein said second seal means comprises an O-ring disposed in a recess in the inner bore of said central hole formed in said cap body member.

12. The cap of claim 1, wherein said first seal means comprises an O-ring disposed in a recess formed in said annular groove in said cap body member.

13. The cap of claim 12, wherein the cross-sectional shape of said annular sealing member of uniform cross-sectional shape upstanding from an exterior wall of said tank comprises a generally semi-circular outermost portion, sized such that said O-ring mates with a radially outer portion thereof.

14. The cap of claim 1 wherein at least three of each of said ears and fingers are provided.

15. The cap of claim 1, wherein said actuator rod is keyed to said anchor disk.

16. The cap of claim 15 further comprising means for preventing rotation of said cap body member with respect to said adapter.

17. The cap of claim 16, wherein said means for preventing rotation comprises projections formed on said cap body member which fit between said ears on said adapter.

18. A cap for a vehicle fuel tank, said tank comprising an adapter defining a fuel filler opening surrounded by an annular sealing member of defined cross-sectional shape, said cap comprising a generally circular, planar cap body member having a annular recess for receiving and mating with said annular sealing member, a locking handle pivoted at a first end thereof about a pivot point near the center of said cap body member for rotation from an upstanding free position to a locking position in which said handle extends generally parallel to the plane of said cap, and means for locking said cap to said adapter when said handle is in said locking position, the periphery of said cap body member being formed such that it defines an upstanding rim means extending further above the plane of the outer surface of said cap body member than at least the central portion of said handle, whereby impact forces arising when said cap is contacted by a planar object are received by said rim means and transferred to said adapter.

19. The cap of claim 18, wherein said rim means comprises a plurality of castellations upstanding from and spaced around the periphery of said cap.

20. The cap of claim 19 wherein said castellations project from the surface of said cap and are formed to intersect said surface at relatively large-radius corners, whereby rain, snow, mud and the like are prevented from accumulating in said corners.

21. The cap of claim 20 wherein the second end of said handle extends slightly beyond the radially outer periphery of said cap, whereby it transfers impacts to the cap body member in the same manner as do the castellations.

* * * * *